United States Patent Office 3,057,691
Patented Oct. 9, 1962

3,057,691
METHOD FOR PRODUCING SILICON
Frank Veres, Toledo, Ohio, assignor to Owens-Illinois Glass Company, a corporation of Ohio
No Drawing. Filed Jan. 3, 1961, Ser. No. 80,050
13 Claims. (Cl. 23—223.5)

This invention relates to an improved method for producing elemental silicon and, more particularly, to a method for recovering greater amounts of elemental silicon from silica present in glass.

With the rapid advance of modern technology, the need for substantially pure elemental silicon for use in electronic components, including transistors, rectifiers, solar batteries, and the like, has increased during the last several years. Semi-conductors, such as pure silicon, are a unique group of materials which have some of the properties of insulators, other of conductors, and still others peculiar to themselves. Small amounts of impurities intentionally added to the sliicon crystal lattice produce desirable properties such as the ability to rectify current. On the other hand, uncontrolled amounts of impurities render the silicon virtually useless. It is extremely important that the recovered silicon be free from impurities such as boron, phosphorus, and arsenic, or its usefulness is seriously impaired.

Semi-conductor devices made of silicon in single crystal form with controlled impurity levels can do almost anything that vacuum tubes can do, i.e. amplify, rectify, oscillate, count, etc., with greater reliability and efficiency, and in a smaller space. Single crystals may be grown which are up to 1½ inches in diameter and several inches long and which, when sliced into wafers, can be used in devices such as transistors, solar batteries, power rectifiers, etc.

While silicon is abundant in nature, it is only found combined with other elements in the form of sand, quartz, ores, clays, and the like. To remove substantially pure elemental silicon from its combined state the raw material may be subjected to any one of several known processes. These are usually complex, tedious, involve a number of reactants, utilize extremely high temperatures, and, when used on a commercial scale, result in a high cost per unit amount of silicon produced.

One type of known process is based on the vapor phase reduction of silicon-containing compounds wherein the materials utilized in the process are subjected to an extreme degree of refinement, such as to repeated distillations, before they enter the silicon manufacturing process. To insure freedom from impurities in the atmosphere, these silicon manufacturing plants are usually located in areas remote from cities and industrial plants.

Another known process involves the formation of an aluminum-silicon alloy melt by reacting aluminum with glass in a ratio of at least an equal amount of aluminum and, preferably, an excess of aluminum to glass which, when cooled, has the silicon begin to crystallize therefrom at a temperature of about 1100° C. Yields of silicon by this method have been extremely poor.

Accordingly, it is an object of the present invention to dramatically improve the known process of forming elemental silicon by reacting aluminum with glass so as to obtain a vastly greater and unexpected amount of silicon than heretofore believed possible.

It is another object of this invention to increase the amount of silicon present in a silicon-aluminum alloy melt formed by the reaction of aluminum with glass and thus vastly and unexpectedly increase the yield of essentially pure silicon obtained from glass, which silicon will not be oxidized in the silicon-alloy melt to silica.

In attaining the objects of this invention, one feature resides in producing a silicon-aluminum alloy by forming alternate layers of a particular glass frit and aluminum chunks and maintaining these layers at a particular temperature for a predetermined period of time, then removing the silicon from the alloy in the form of crystals, and purifying the crystals.

Another feature resides in first forming a glass composition containing silica and certain flux oxides which will not oxidize the silicon metal to silica, fritting the glass and forming alternate layers of crushed glass and aluminum chunks within a furnace and maintaining the temperature for a predetermined period, slowly cooling the melt and removing the silicon-aluminum alloy therefrom.

Other objects, features, and advantages of the invention will be more apparent from a reading of the following disclosure.

For purposes of producing the elemental silicon in accordance with the invention, a base glass composition having the following formulation is utilized:

|  | Percent |
|---|---|
| $SiO_2$ | 40–80 |
| $Al_2O_3$ | 1–20 |
| RO | 5–16 |
| $R_2O$ | 0.0–1.0 |
| $B_2O_3$ | 0.0–8 |

RO includes the alkaline earth oxides CaO, SrO, BaO and MgO. CaO is the preferred fluxing constituent although the RO group may consist of a combination of these oxides. None of these fluxing oxides will oxidize the silicon to silica. Each of the above materials is relatively low in cost, can be obtained in very pure form, i.e. free of boron, arsenic, and phosphorus.

The $R_2O$ group includes $Na_2O$, $K_2O$ or $Li_2O$ or a combination of these. While the alkali metal oxides oxidize silicon to silica and therefore should be omitted, they do have the necessary function of reducing the high temperature viscosity and the melting temperature of the glass. Thus, they may be included in the base glass composition in very small amounts.

Aluminum serves the purpose of reducing the glass melting temperature.

It is well-known that alkali-free or low-alkali glasses are difficult to melt, and they require very high melting temperatures. A very important factor of this invention is that low-melting glasses can be had without the use of alkali metal oxides but with the use of $B_2O_3$. Of course, there will be boron impurities in the silicon crystals produced whenever $B_2O_3$ is present in the glass base, and these must be removed from or reduced in amount in the silicon crystals by known means.

The glass composition having the above formulation is melted, the molten glass poured, cooled, and crushed to form a glass frit. This frit and chunks of aluminum weighing preferably from about ½ to 2 lbs. each are then alternately added to a hot crucible which is maintained at a temperature of approximately 2000° F. until a silicon-aluminum alloy is formed in the hot melt.

It is important that the amount of glass be present in excess of the aluminum and the preferred ratio is from 1.12 to 1.4 parts of glass to each part of aluminum. Whenever equal parts of the two components are present, or when the aluminum is present in amounts in excess of the glass, the resulting alloys are low in amount of silicon and erratic and unpredictable when subjected to further processing. Thus the silicon yields are extremely poor. However, when an excess of glass is used, not only is there an increase in the amount of silicon in the alloy, but a greater proportion of the silicon is recoverable as elemental silicon.

While the glass compositions coming within the above formulation are preferred, excellent results have been obtained with a glass base having the following formulation:

| | Percent |
|---|---|
| $SiO_2$ | 71.5 |
| $Al_2O_3$ | 1.5 |
| CaO | 10.8 |
| MgO | 2.8 |
| $Na_2O$ | 13.0 |
| $K_2O$ | 0.4 |

While the amount of the alkali metal oxides has been increased over the preferred amount given above, thus oxidizing additional silicon formed in the silicon-aluminum alloy melt, the amount of silicon remaining in the melt, formed by adding alternating layers of crushed glass frit and aluminum chunks to a crucible, without mechanical stirring, was still greatly in excess of that obtained when the aluminum-to-glass ratio was equal or the aluminum present in an amount greater than the glass. Thus, in one test, with an Al/glass ratio of 3:2, the amount of silicon recovered from the alloy was 3.8%, whereas up to 14.1% silicon was recovered by the process of the invention.

A number of tests were conducted with the following soda-lime glass base formulation:

| | Percent |
|---|---|
| Jasper flint | 61.0 |
| Solvay soda ash | 36.7 |
| Sodium fluoride | 2.3 | which is equivalent to:

| | Percent |
|---|---|
| $SiO_2$ | 72.5 |
| $Na_2O$ | 25.2 |
| NaF | 2.3 |
| | 100.0 |

Equal parts by weight (5 lbs.) of the above crushed glass and 1½ lb. pieces of aluminum were added alternately to a crucible, which was at 2000° F., over intervals of 5 to 10 minutes in order to form alternate layers of molten aluminum and molten glass from the bottom to the top of the crucible. When the additions were completed, heating was continued to 2350±30° F. over a six hour period, and the silicon-aluminum alloy was removed. The alloy yield was 3.3 lbs. The average percent of alloy recovered as silicon was 2.8%, based upon nine reactions.

When the same tests were run except that the aluminum was present in a ratio to glass of 4:3 (6.4 lbs. of aluminum and 5 lbs. of glass), and the total reaction time was extended to 20 hours by allowing the furnace to cool from the peak temperature of 2350° F. to 1900° F. overnight, and tapping the alloy next morning, the alloy yield was 3.25 lbs. The average percent of alloy recovered from 43 reactions as silicon was 4.8%.

However, when a series of tests were run wherein the aluminum-to-glass ratio of 4:3 was changed to a glass-to-aluminum ratio of 6:5, everything else remaining the same in the process, the average percent of alloy recovered as silicon was 18.1%.

In another series of tests, the fritting step was omitted. Instead, 11 pounds of raw glass batch of the same formulation as used above were melted down in the reaction crucible, netting 9.3 lbs. of glass after evolution of the carbon dioxide. Several chunks of aluminum totaling seven pounds were added directly to the molden glass in ten to fifteen minute intervals, the glass being at a temperature of approximately 2000° F. The same temperature schedule was followed as before, heating to 2350±30° F. and then cooling to 1900° F. overnight for a total reaction time of 22 hours. The average percent of alloy recovered as silicon, based upon 43 reactions, was 8.8%.

Thus, from the above tests, it is evident that when there is an excess of glass present in the aluminum-glass composition, a greater percent of silicon is obtained from the alloy than when the known processes of using an aluminum-to-glass ratio of 1:1 or an excess of aluminum are practiced.

Further, from the above, it is seen that the use of the improved method of alternating layers of glass frit (in excess amounts) with aluminum chunks, without any stirring, results in more than double the yield of silicon than when the fritting step is omitted, and quadruple the amount obtained when there is an equal amount of or an excess of aluminum. This result is totally unexpected.

The following examples are also merely illustrative of the process of this invention, and are not to be considered as limiting in any way. For each example, the glass had the following composition:

| | Parts by weight |
|---|---|
| Silica | 9.2 |
| Soda ash | 5.5 |
| Sodium fluoride | 0.3 |

The above ingredients were melted, fined, poured, cooled and crushed, i.e. fritted to particles ranging in size from one-quarter inch and less.

Example I

A ceramic crucible was heated to a temperature of 2000° F. and alternate layers of crushed glass and aluminum chunks were added thereto in intervals of from 5 to 20 minutes to form successive layers of crushed glass and aluminum, the glass being present in a ratio of 1.2 parts to each part of aluminum. When the additions were completed, the temperature was increased to 2300° F. for a period of five hours and then the temperature was permitted to drop slowly over a period of twelve hours to 1900° F. The silicon-aluminum alloy was poured from the crucible and from X-ray defraction it was noted that it contained 25.5% of silicon by volume. The alloy was then treated with hydrochloric acid and 18.1% by weight of the alloy was recovered as elemental silicon.

Example II 11 parts by weight of the raw glass composition was reacted with 7.1 parts by weight of aluminum in a crucible in the manner of Example I. 4.26 parts by weight of a silicon-aluminum alloy was recovered and, when subjected to X-ray defraction, it was noted that 20% by volume of the alloy was silicon. After treating the alloy with hydrochloric acid, 18.9% by weight of the alloy was recovered as elemental silicon.

The aluminum which is preferred in the process of this invention is in chunks weighing from about one-half to about two pounds apiece. Thus, a greater surface area of crushed glass is provided for exposure to the aluminum and results in formation of a silicon-aluminum alloy having a larger proportion of silicon therein and results in a higher yield of elemental silicon. The purity of the aluminum utilized in all tests was from 99.86% to 99.99% pure.

Use of crushed glass in the process is important since the glass envelops the aluminum and prevents oxidation of the aluminum by the presence of air. Use of the large chunks of aluminum minimizes the oxidation thereof prior to its being enveloped by the glass.

Feeding the aluminum chunks directly to the glass in the heated crucible is important in that it simplifies the process and at the same time results in an excellent yield. This makes production on a larger scale possible with a simpler and easier procedure. The time is also important, since the reaction between the glass and aluminum to form the silicon-aluminum alloy is not instantaneous, but rather takes place by diffusion over a period of time, preferably from 10 to 24 hours. High temperatures accelerate the diffusion. The delay in adding alternate layers of glass and aluminum chunks to the crucible, which delay is about 5 to 20 minutes, is due to the fact that a layer must melt before another layer may be added thereto.

The raw materials entering the process of the invention were selected from the purest obtainable, but were not subjected to refining or purification before they entered the silicon process.

At the elevated temperatures of the above process, the aluminum reduces silica in the molten glass to silicon, then takes the silicon into solution, forming an aluminum-silicon alloy. The alloy is then poured leaving a visible mass of a cement-like material in the spent crucible. To increase the grain size of the silicon in the alloy, the alloy is nucleated, i.e. held at an elevated temperature to permit the silicon crystals to grow in size. The aluminum is then dissolved away by a mineral acid, such as hydrochloric acid, leaving silicon as a residue. This silicon residue is then subjected to a flotation step, consolidated by melting, and finally crushed and acid washed.

Nucleation is usually accomplished by placing the alloys into refractory saggers, placing the saggers into a furnace, heating to 1240° F. and holding this temperature for 48 hours.

Having disclosed how the amount of silicon recovered from a silicon-aluminum alloy melt may be increased, it is within the skill of the art to utilize this excessive yield of silicon to the fullest in producing silicon crystals of the highest purity.

While mineral acids are usually utilized to dissolve the aluminum in order to obtain the remaining insoluble, elemental silicon, it is evident that any acid which is a solvent for the aluminum and in which the silicon is inert, will be suitable for separating the silicon from the aluminum, or vice versa.

Having fully described the invention, what is claimed is:

1. The process for increasing the yield of elemental silicon from a glass base composition having the formulation

| | Percent |
|---|---|
| $SiO_2$ | 40–80 |
| $Al_2O_3$ | 1–20 |
| RO | 5–16 |
| $R_2O$ | 0.0–1 |
| $B_2O_3$ | 0.0–8 | wherein RO is a member selected from the group consisting of BaO, CaO, MgO, SrO and mixtures thereof and $R_2O$ is a member selected from the group consisting of $Na_2O$, $K_2O$ and $Li_2O$, comprising melting said glass base, adding aluminum chunks to an excess by weight of said molten glass base, maintaining the mixture from 10 to 24 hours at the elevated temperature to form a silicon-aluminum alloy, removing said silicon-aluminum alloy, treating said alloy with an acid which is a solvent for aluminum but which is inert to silicon, and recovering the remaining insoluble component as elemental silicon.

2. The process as defined in claim 1 wherein the ratio of said glass to aluminum is from 1.12 to 1.4 parts per each part of aluminum.

3. The process for increasing the yield of elemental silicon from a glass base composition having the formulation

| | Percent |
|---|---|
| $SiO_2$ | 40–80 |
| $Al_2O_3$ | 1–20 |
| RO | 5–16 |
| $R_2O$ | 0.0–1 |
| $B_2O_3$ | 0.0–8 | wherein RO is a member selected from the group consisting of BaO, CaO, MgO, SrO and mixtures thereof and $R_2O$ is a member selected from the group consisting of $Na_2O$, $K_2O$ and $Li_2O$, comprising fritting said glass composition, forming alternate molten layers of said fritted glass and aluminum chunks at a temperature of about 2000° F., said glass being present in excess by weight of said aluminum, cooling said molten layers to 1900° F. over a period of from 10–24 hours, removing the silicon-aluminum alloy which is formed, treating the alloy with an acid which is a solvent for aluminum and is inert to silicon, and recovering the insoluble component as elemental silicon.

4. The process as defined in claim 3 wherein the ratio of said glass to aluminum is from 1.12 to 1.4 parts per each part of aluminum.

5. The process as defined in claim 4 wherein said aluminum chunks are each from about ½ to about 2 lbs. in weight.

6. The process for increasing the yield of elemental silicon from a glass base composition having the formulation

| | Percent |
|---|---|
| $SiO_2$ | 71.5 |
| $Al_2O_3$ | 1.5 |
| CaO | 10.8 |
| MgO | 2.8 |
| $Na_2O$ | 13.0 |
| $K_2O$ | 0.4 | comprising fritting said glass composition, forming alternate molten layers of said fritted glass and aluminum chunks at a temperature of about 2000° F., said glass being present in excess by weight of said aluminum, cooling said molten layers to 1900° F. over a period of from 10–24 hours, removing the silicon-aluminum alloy which is formed, treating the alloy with an acid which is a solvent for aluminum and is inert to silicon, and recovering the insoluble component as elemental silicon.

7. The process for increasing the yield of elemental silicon from a glass base composition having the formulation

| | Percent |
|---|---|
| $SiO_2$ | 72.5 |
| $Na_2O$ | 25.2 |
| NaF | 2.3 | comprising fritting said glass composition, forming alternate molten layers of said fritted glass and aluminum chunks at a temperature of about 2000° F., said glass being present in excess by weight of said aluminum, cooling said molten layers to 1900° F. over a period of from 10–24 hours, removing the silicon-aluminum alloy which is formed, treating the alloy with an acid which is a solvent for aluminum and is inert to silicon, and recovering the insoluble component as elemental silicon.

8. The process as defined in claim 7 wherein the ratio of said glass to aluminum is from 1.12 to 1.4 parts per each part of aluminum.

9. The process as defined in claim 8 wherein said aluminum chunks are each from about ½ to about 2 lbs. in weight.

10. The process for increasing the yield of elemental silicon from a glass composition comprising melting said glass composition, adding aluminum chunks to the molten glass, said glass in the resulting molten mixture being in excess by weight of said aluminum, maintaining the mixture thus formed in a molten condition for a period of time sufficient to form a silicon-aluminum alloy, removing said silicon-aluminum alloy, treating said alloy with an acid which is a solvent for aluminum but which is inert to silicon, and recovering the remaining insoluble component as elemental silicon.

11. The process for increasing the yield of elemental silicon from a glass frit comprising the steps of melting said glass frit, adding aluminum chunks to said molten glass and melting said chunks in said molten glass, adding glass frit to the molten mass and melting said frit therein, and alternating said steps of adding and melting said aluminum chunks and said glass frit into said molten mass, said glass in the resulting molten mixture being in excess by weight of said aluminum, maintaining the resultant mass in a molten condition for a period of time sufficient to form a silicon-aluminum alloy, removing said silicon-aluminum alloy from the mass, treating said alloy with an acid which is a solvent for aluminum but which is inert to silicon and recovering the remaining insoluble component as elemental silicon.

12. The process as defined in claim 11 wherein the ratio of said glass to aluminum is from 1.12 to 1.4 parts for each part of aluminum.

13. The process as defined in claim 12 wherein said aluminum chunks are each from about one-half to about two pounds in weight.

References Cited in the file of this patent

UNITED STATES PATENTS

| | | |
|---|---|---|
| 1,386,227 | Becket | Aug. 2, 1921 |
| 2,469,418 | Striplin | May 10, 1949 |